Sept. 20, 1949.   C. M. PARK   2,482,362
DUST COLLECTOR
Filed Oct. 7, 1946   3 Sheets-Sheet 1
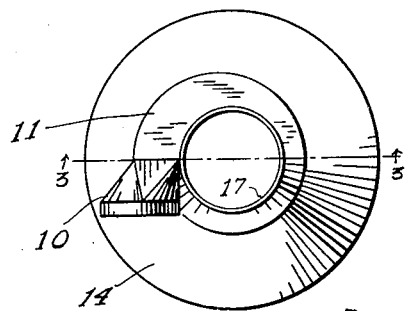
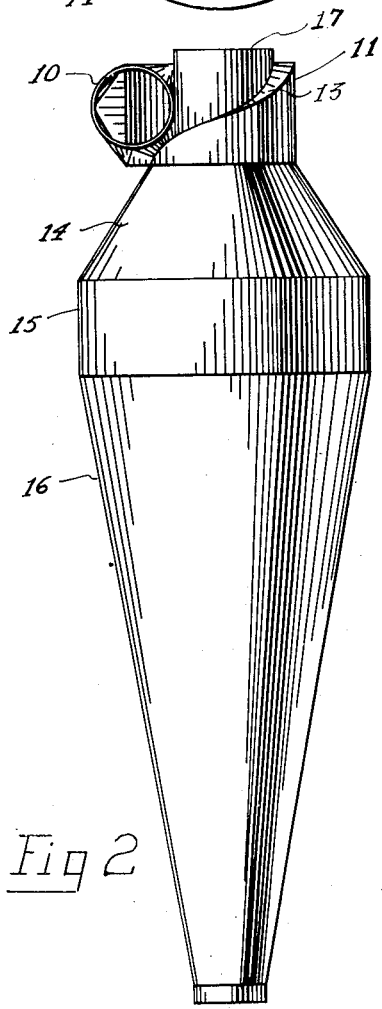
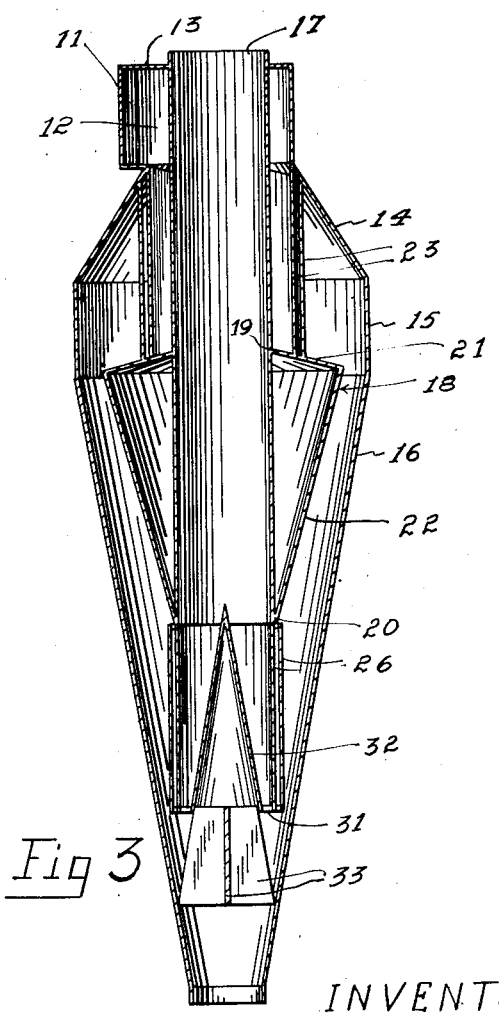
INVENTOR
Chauncey M Park
By Greek Wells
Atty Sept. 20, 1949.　　　　C. M. PARK　　　　2,482,362
DUST COLLECTOR
Filed Oct. 7, 1946　　　　　　　　　　　3 Sheets-Sheet 2
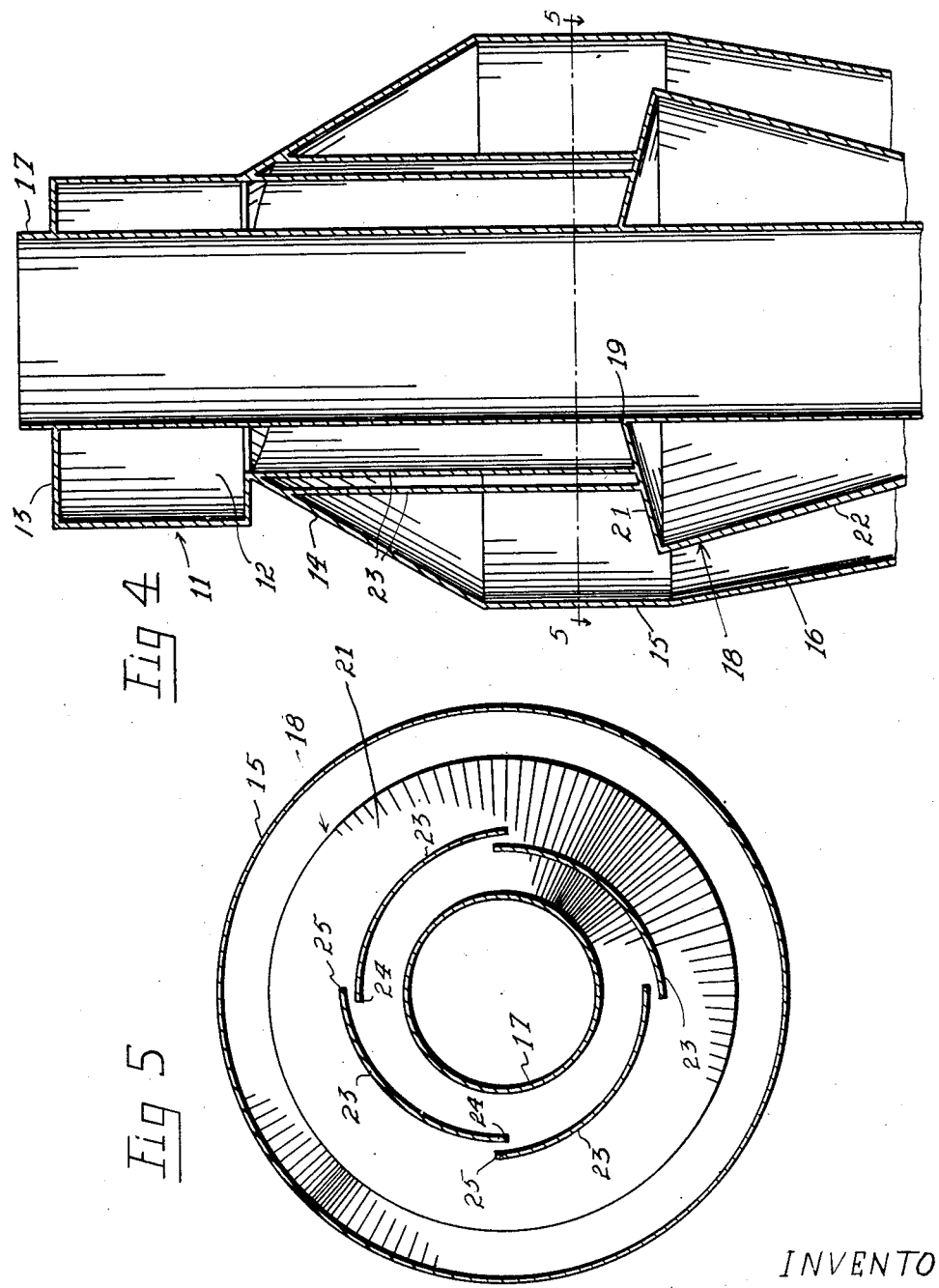
INVENTOR
Chauncey M Park
By Greek Wells
Atty Sept. 20, 1949. C. M. PARK 2,482,362
DUST COLLECTOR
Filed Oct. 7, 1946 3 Sheets-Sheet 3

INVENTOR
Chauncey M Park
By *Sreek Wells*
Atty

Patented Sept. 20, 1949

2,482,362

UNITED STATES PATENT OFFICE 2,482,362

DUST COLLECTOR

Chauncey M. Park, Evanston, Ill.

Application October 7, 1946, Serial No. 701,748

13 Claims. (Cl. 183—83)

The present invention relates to dust collectors of the cyclone or centrifugal type. These collectors have in general, an inlet for the dust laden air at the top thereof. The air enters at a tangent to a portion of the separating chamber which usually has a conical lower part, and is caused to whirl in a spiral path that decreases in diameter toward the bottom or discharge end of the conical lower part. Near this bottom end the air is fed into a central tube that extends upwardly through the separating chamber and discharges to atmosphere. The dust is discharged downwardly at the lower end of the conical part. Separation is primarily by centrifugal force which separates the heavier dust particles from the air and gravity causes them to slide down the conical part to the dust outlet.

Efficiency of collection in collectors of this type is enhanced by reducing turbulence of the air, and by utilization of adequate velocity to provide the centrifugal force necessary to effect good separation. Efficiency of operation is also important and reduction of back pressure in the collector is, of course, desirable from this standpoint.

It is the purpose of my invention to provide, in a dust collector of the type heretofore referred to, a novel relation of parts whereby dust laden air is brought into the collector on a tangent to a circle of much less diameter than the maximum diameter of the collector, and is then spiralled downwardly and outwardly in an acceleration chamber, increasing its velocity to a maximum with minimum turbulence while maintaining its cross sectional area in such manner that it is decreased with velocity increase, then the air is advanced along its spiral path to a deceleration chamber where again its cross section is corrected for the change in velocity and, finally, the air is removed from the dust retaining area and deprived of its rotational energy as it enters the central discharge tube so as to move upwardly to atmosphere in a mass of substantially uniform speed and pressure.

My invention contemplates as an essential combination in such a collector, separate chambers or zones, one where the path of the spiral ribbon of air is expanded in diameter and air velocity is increased and another where the path of the spiral ribbon of air is contracted in diameter and air velocity is decreased, the chambers overlapping only to the extent necessary to pass the ribbon from one chamber to the next.

In this connection it is the purpose of my invention to provide in such a combination, means whereby the radial thickness of a particular ribbon of air is maintained substantially the same at the three critical points in its path, namely the beginning point of accelerated velocity, the point of maximum velocity, and the outlet point where the air is led into the central column.

Specifically it is a purpose of my invention also to provide a novel arrangement of guiding surfaces in the collector whereby compensatory changes in cross sectional area of the spiral ribbon of air as it changes velocity is brought about by expanding and contracting the ribbon axially of the collector and the radial thickness of the ribbon is changed very slightly if at all.

It is also a purpose of my invention to provide a dust collector wherein the air is accelerated and moved spirally outward and downward until it reaches the maximum diameter of the collector, the contraction in cross section being vertical to compensate for the increased velocity, and the layer of air is then maintained in contact to a substantial degree with the lower conical part of the collector shell as its velocity is decreased to facilitate separation of the dust from the air, the vertical height of the layer being increased to compensate for the loss of velocity of the air.

It is a further purpose of my invention to provide a novel means for converting the downward spiral flow of the air stream to an upward nonrotating movement with a minimum turbulence at the lower part of the dust collector.

The nature and advantages of my invention will appear more fully from the following description and the accompanying drawings illustrating a preferred form of the invention. It should be understood, however, that the drawings and description are illustrative only, and are not to be taken as limiting the invention except insofar as it is limited by the claims.

In the drawings:

Figure 1 is a plan view of a dust collector embodying my invention;

Figure 2 is a view in side elevation of the dust collector;

Figure 3 is a sectional view on the line 3—3 of Figure 1;

Figure 4 is an enlarged fragmentary sectional view taken on the line 3—3 of Figure 1, illustrating the upper portion of the collector;

Figure 5 is a sectional view on the line 5—5 of Figure 4;

Figure 6:
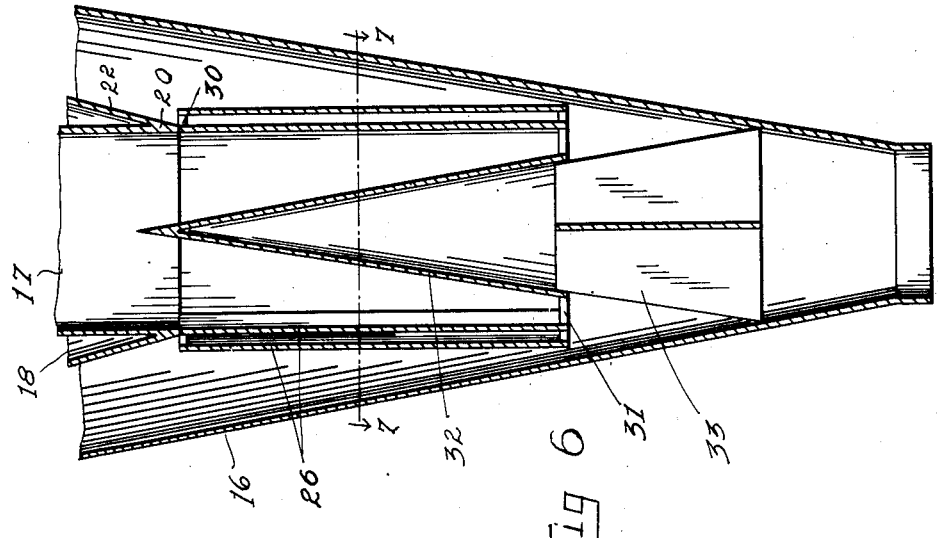
Figure 6 is an enlarged fragmentary sectional view on the line 3—3 of Figure 1, illustrating the lower portion of the collector.
Figure 7:
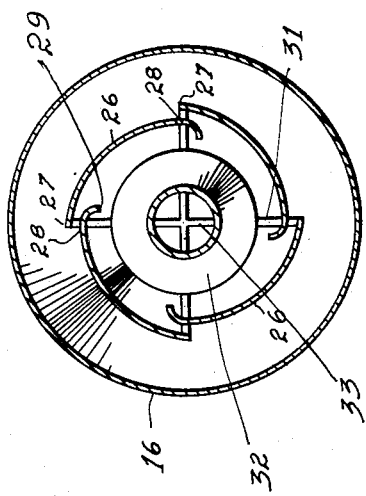
Figure 7 is a sectional view on the line 7—7 of Figure 6.

Referring now to the drawings, the collector has an inlet member 10 by which it may be connected to a conduit of circular cross section. The inlet member 10 opens into a scroll 11 of equal cross section, and the scroll has its wall surface 12 so formed that during the first 180° of circumference the radial thickness of the space within the scroll for entering air is reduced to substantially one-half of its thickness at the entrance end. The scroll has its top surface 13 curved downwardly during the next 180° of circumference to terminate at the level of the bottom edge of the scroll at its point of joining the inlet member. There is an annular opening in the bottom of the scroll with uniform width equal to the radial distance from an outlet tube 17 to inner edges 24 of guide vanes 23. Scroll cross section at inlet end is equal to the cross section of inlet member 10, and the cross section is reduced uniformly through the entire 360°. In the illustration, uniform cross section reduction in the first 180° is accomplished by reduction of radial thickness with constant height, and in the second 180° by reduction of height with constant radial thickness. Uniform reduction of cross section forces the incoming air downward uniformly through the entire 360° of annular opening.

The collector has a downwardly expanding conical shell portion 14 joined to the lower edge of the scroll. This shell portion 14 is joined at its lower edge by a cylindrical shell portion 15 which in turn is joined at its lower edge to a downwardly contracting conical shell portion 16, which is open at its lower end.

Centrally disposed in the shell consisting of the portions 14, 15 and 16, is the outlet tube 17. The tube 17 extends upwardly through the scroll 11, and the top wall 13 of the scroll is secured by welding or otherwise to the tube 17. The tube 17 extends down into the shell portion 16.

Within the shell portions 15 and 16, I provide a guiding member 18 which is joined at its upper edge 19 and lower edge 20 to the tube 17. The upper surface 21 of the member 18 may be conical, having any convenient pitch, and if extended, would intersect the junction of the shell portions 15 and 16. The radial distance from the outer edge of the surface 21 to the shell portion 15 is substantially equal to the radial thickness of the annular opening from the inlet scroll 11 into the upper end of the shell portion 14. The axial height of shell portion 15 bears the same relation to the height of vane edges 24 as the radial distance between the collector axis and edge 24 bears to the radial distance between the axis and shell portion 15. The lower portion 22 of the member 18 is tapered inwardly forming a conical surface which, if extended upwardly, would meet the line where the shell portions 14 and 15 are joined together. The lower edge of the portion 22 joins the lower edge of the tube 17.

A series of vanes 23 are provided in the space between the scroll 11 and the top surface 21 of the member 18. These vanes 23 have their inner edges 24 spaced from the tube 17 a distance substantially equal to the radial thickness of the annular opening from the inlet scroll 11 into the upper end of the shell portion 14. The vanes 23 are directed in a smooth curve outwardly and circumferentially about the tube 17, so that their outer edges 25 are spaced from the inner edges 24 sufficiently to provide passages the total cross sectional area of which is at least equal to the cross sectional area of the space between one inner edge 24 and the tube 17. The cross section of the annular chamber directly under the inlet scroll is equal to the cross section of the inlet member 10, and is defined as the radial distance between the tube 17 and vane edge 24 multiplied by the length of the edge 24. Air entering the inlet member 10 is transferred in one revolution to the annular chamber under the scroll where it rotates without change in velocity. The radial distance between edges 24 and 25 is equal to the radial distance from tube 17 to edge 24 divided by the number of vanes, and the air leaves the annular chamber through the openings between vanes without appreciable velocity change from the velocity in the inlet member 10. Dimensions are such that the ratio between the cross sectional area of tube 17 and the cross sectional area of inlet member 10 is equal to the ratio between the radial distances from the collector axis to edge 24 and from the axis to the wall of tube 17. With this relationship, linear velocity of the rotating air at the circumference of tube 17 will be equal to the average ascending velocity of the air within the tube. The pitch of conical shell portion 16 is such that it would intersect a downward extension of tube 17 at a distance below the lower end of tube 17 equal to the axial height of edges 24 multiplied by the ratio between radial distances from collector axis to edges 24 and from the axis to the wall of tube 17.

At the lower end of the tube 17 a series of vanes 26 are arranged. These vanes are arranged and spaced so that the sum of the radial distances between the outer edges 27 of the vanes 26 and the inwardly adjacent surfaces 28 of the next vanes equals the sum of the radial distances between the edges 24 and 25 of vanes 23, and if extended downward to intersection with cylindrical shell portion 16, would provide an inlet area to the lower end of tube 17 substantially equal to the cross sectional area of tube 17.

The inner edges 29 of the vanes 26 are directed radially inward, the adjacent portions of the vanes being smoothly curved from the surface 28 to the edges 29. This directs the air radially inward to eliminate spiral motion as the air rises in the tube 17. Such spiral motion tends to create a low pressure area centrally of the tube 17, that will cause air to rush in through the lower end of the shell portion 16 and downwardly into the tube 17 from the top.

The vanes 26 are secured by connecting bars 30 at their top edges. At their lower edges the vanes are connected together by a spider 31. The spider 31 supports a cone-shaped hollow member 32 that extends upwardly being centered on the axis of the tube 17. If extended downward, this conical member 32 would intersect conical shell portion 16 at the circle of intersection of shell 16 with the downward extension of tube 17. Clearance between the lower end of member 32 and the lower edges of vanes 26 provides additional inlet area to tube 17 to compensate for the abbreviation of vanes 26 by which clearance for passage of dust past the vanes to the lower end of shell member 16 is provided. This member 32 restricts the inlet of air at the lower ends of the vanes and tends to reduce velocity differences in the ascending air in the space within vanes 26. It also tends to prevent stray currents of air at the bottom of the collector from carrying dust up into the tube 17. Radially extending vanes 33 below the spider are used to oppose any whirling of air and dust below the vanes 26.

The dust removed by centrifugal force falls down along the inner surface of the shell portion 16 and is removed through its lower end.

Throughout the collector the construction is such that the radial thickness of a ribbon of air is the same at all the critical points. The air velocity increases from the passages between the edges 24 and 25 of the vanes 23 to the cylindrical shell portion 15, and the height of the ribbon is decreased by the tapered shell portion 14 and the surface 21. When the ribbon moves down past the surface 21 the shell portion 16 begins to restrict its radius of rotation and velocity drops. The shapes of the shell portion 16 and the portion 22 of the member 18 are such as to gradually allow the ribbon to increase its vertical dimension to make up for this velocity loss and maintain the radial thickness the same for the ribbon until it is taken into the area within the vanes 26. This arrangement avoids turbulence and keeps the pressure uniform and fairly constant. The only back pressure to be overcome, aside from friction losses, is that necessary to bring the swirling air from the diameter within the vanes 23 down to the diameter within the vanes 26. The surfaces of the shell portions 14 and 16 and the cooperating surfaces 21 and 22 are made conical for convenience in fabrication although this shape does not exactly maintain the mathematical relation between the surfaces for the correct cross section of the air passage between the points hereinbefore mentioned as critical points. However it is sufficiently close for practical purposes. These surfaces may of course be constructed to substantially the exact curvature to vary the cross of air in proportion to the changes in velocity, and such construction is within the scope of my invention.

From the foregoing description it is believed that the nature and advantages of my invention will be clear to those skilled in this art.

Having thus described my invention, I claim:

1. In a dust collector of the character described comprising an upper, downwardly expanding shell portion, an intermediate cylindrical shell portion joined thereto, and a lower downwardly contracting shell portion joined to the lower edge of the cylindrical portion, an inlet scroll at the upper end of the upper shell portion opening downwardly into the upper shell portion, a central discharge tube forming the inner wall of the inlet scroll and extending downwardly into the lower shell portion, guide vanes arranged circumferentially about the tube in spaced relation thereto and extending downwardly from the scroll for directing air spirally outward from the tube within the upper and intermediate shell portions, and means forming a guide surface extending outwardly from the tube toward the lower edge of the intermediate shell portion and terminating at a distance inwardly from said edge, the upper edges of said guide vanes abutting the downwardly expanding shell portion and the lower edges of said vanes abutting said guide surface.

2. In a dust collector of the character described comprising an upper, downwardy expanded shell portion, an intermediate cylindrical shell portion joined thereto, and a lower downwardly contracting shell portion joined to the lower edge of the cylindrical portion, an inlet scroll at the upper end of the upper shell portion opening downwardly into the upper shell portion, a central discharge tube forming the inner wall of the inlet scroll and extending downwardly into the lower shell portion, vane means arranged circumferentially about the tube in spaced relation thereto and extending downwardly from the scroll for directing air spirally outward from the tube within the upper and intermediate shell portions, means forming a guide surface extending outwardly from the tube toward the lower edge of the intermediate shell portion and terminating at a distance inwardly from said edge, means forming a downwardly contracting guide surface extending downwardly into the lower shell portion from the outer edge of said last named guide surface and terminating on the lower edge of said central tube, and vanes means extending downwardly from the lower edge of said tube for directing air into the tube.

3. In a dust collector of the character described comprising an upper, downwardly expanding shell portion, an intermediate cylindrical shell portion joined thereto, and a lower downwardly contracting shell portion joined to the lower edge of the cylindrical portion, an inlet scroll at the upper end of the upper shell portion opening downwardly into the upper shell portion, a central discharge tube forming the inner wall of the inlet scroll and extending downwardly into the lower shell portion, said shell portions, said scroll, and said central tube being concentric, guide vanes arranged circumferentially about the tube in spaced relation thereto and extending downwardly from the scroll for directing air spirally outward from the tube within the upper and intermediate shell portions, and means forming a guide surface extending outwardly from the tube toward the lower edge of the intermediate shell portion and terminating at a distance inwardly from said edge, the radial distance from the discharge tube to the inner edges of the vane means being substantially equal to the radial distance from the outer edge of said guide surface to the cylindrical shell portion, the upper edges of said guide vanes abutting the downwardly expanding shell portion and the lower edges of said vanes abutting said guide surface.

4. In a dust collector of the character described comprising an upper, downwardly expanding shell portion, an intermediate cylindrical shell portion joined thereto, and a lower downwardly contracting shell portion joined to the lower edge of the cylindrical portion, an inlet scroll at the upper end of the upper shell portion opening downwardly into the upper shell portion, a central discharge tube forming the inner wall of the inlet scroll and extending downwardly into the lower shell portion, vane means arranged circumferentially about the tube in spaced relation thereto and extending downwardly from the scroll for directing air spirally outward from the tube within the upper and intermediate shell portions, means forming a guide surface extending outwardly from the tube toward the lower edge of the intermediate shell portion and terminating at a distance inwardly from said edge, means forming a downwardly contracting guide surface extending downwardly into the lower shell portion from the outer edge of said last named guide surface and terminating on the lower edge of said central tube, and vane means extending downwardly from the lower edge of said tube for directing air into the tube, said last named vane means comprising a series of spirally arranged vanes overlapped at their outer edges with the adjacent vanes, the vanes having their inner edges directed radially inward toward the vertical axis of said tube.

5. In a dust collector of the character described comprising an upper, downwardly expanding shell portion, an intermediate cylindrical shell portion joined thereto, and a lower downwardly contracting shell portion joined to the lower edge of the cylindrical portion, an inlet scroll at the upper end of the upper shell portion opening downwardly into the upper shell portion, a central discharge tube forming the inner wall of the inlet scroll and extending downwardly into the lower shell portion, said shell portions, said scroll and said central tube being concentric, vane means arranged circumferentially about the tube in spaced relation thereto and extending downwardly from the scroll for directing air spirally outward from the tube within the upper and intermediate shell portions, means forming a guide surface extending outwardly from the tube toward the lower edge of the intermediate shell portion and terminating at a distance inwardly from said edge, means forming a downwardly contracting guide surface extending downwardly into the lower shell portion from the outer edge of said last named guide surface and terminating on the lower edge of said central tube, and vane means extending downwardly from the lower edge of said tube for directing air into the tube, the radial distance from the discharge tube to the inner edges of the vane means being substantially equal to the radial distance from the outer edge of said first named guide surface to the cylindrical shell portion.

6. In a dust collector of the character described comprising an upper, downwardly expanding shell portion, an intermediate cylindrical shell portion joined thereto, and a lower downwardly contracting shell portion joined to the lower edge of the cylindrical portion, an inlet scroll at the upper end of the upper shell portion opening downwardly into the upper shell portion, a central discharge tube forming the inner wall of the inlet scroll and extending downwardly into the lower shell portion, vane means arranged circumferentially about the tube in spaced relation thereto and extending downwardly from the scroll for directing air spirally outward from the tube within the upper and intermediate shell portions, means forming a guide surface extending outwardly from the tube toward the lower edge of the intermediate shell portion and terminating at a distance inwardly from said edge, means forming a downwardly contracting guide surface extending downwardly into the lower shell portion from the outer edge of said last named guide surface and terminating on the lower edge of said central tube, and vane means extending downwardly from the lower edge of said tube for directing air into the tube, said last named vane means comprising a series of spirally arranged vanes overlapped at their outer edges with the adjacent vanes, the vanes having their inner edges directed radially inward toward the vertical axis of said tube, and an upwardly converging tapered deflector extending upwardly between the vanes from their lower ends.

7. In a dust collector of the character described comprising an upper, downwardly expanding shell portion, an intermediate cylindrical shell portion joined thereto, and a lower downwardly contracting shell portion joined to the lower edge of the cylindrical portion, an inlet scroll at the upper end of the upper shell portion opening downwardly into the upper shell portion, a central discharge tube forming the inner wall of the inlet scroll and extending downwardly into the lower shell portion, vane means arranged circumferentially about the tube in spaced relation thereto and extending downwardly from the scroll for directing air spirally outward from the tube within the upper and intermediate shell portions, and means forming a guide surface extending outwardly from the tube toward the lower edge of the intermediate shell portion and terminating at a distance inwardly from said edge, the ratio of the distance on a line parallel to the axis of the cylindrical shell portion from the guide surface to the upper edge of the upper shell portion to the axial height of the cylindrical shell portion being equal to the ratio of the radius of the cylindrical shell portion to the radius of the upper edge of the upper shell portion.

8. In a dust collector of the character described comprising an upper, downwardly expanding shell portion, an intermediate cylindrical shell portion joined thereto, and a lower downwardly contracting shell portion joined to the lower edge of the cylindrical portion, an inlet scroll at the upper end of the upper shell portion opening downwardly into the upper shell portion, a central discharge tube forming the inner wall of the inlet scroll and extending downwardly into the lower shell portion, vane means arranged circumferentially about the tube in spaced relation thereto and extending downwardly from the scroll for directing air spirally outward from the tube within the upper and intermediate shell portions, means forming a guide surface extending outwardly from the tube toward the lower edge of the intermediate shell portion and terminating at a distance inwardly from said edge, means forming a downwardly contracting guide surface extending downwardly into the lower shell portion from the outer edge of said last named guide surface and terminating on the lower edge of said central tube.

9. In a dust collector of the character described comprising an upper, downwardly expanding shell portion, an intermediate cylindrical shell portion joined thereto, and a lower downwardly contracting shell portion joined to the lower edge of the cylindrical portion, an inlet scroll at the upper end of the upper shell portion opening downwardly into the upper shell portion, a central discharge tube forming the inner wall of the inlet scroll and extending downwardly into the lower shell portion, vane means arranged circumferentially about the tube in spaced relation thereto and extending downwardly from the scroll for directing air spirally outward from the tube within the upper and intermediate shell portions, and means forming a guide surface extending outwardly from the tube toward the lower edge of the intermediate shell portion and terminating at a distance inwardly from said edge, said vane means providing passages between the inner and outer edges of adjacent vanes, the sum of the radial distances between said inner and outer edges across said passages being substantially equal to the radial distance from the outer edge of the guide surface to the cylindrical shell portion.

10. In a dust collector of the character described, an upper, downwardly expanding shell portion, an intermediate cylindrical shell portion joined thereto, and a lower downwardly contracting shell portion joined to the lower edge of the cylindrical portion, an inlet scroll at the upper end of the upper shell portion opening downwardly into the upper shell portion, a central discharge tube forming the inner wall of the inlet scroll and extending downwardly into the lower shell portion, said shell portions, said scroll and said central tube being concentric, guide vanes arranged circumferentially about the tube in spaced relation thereto and extending downwardly from the scroll for directing air spirally outward from the tube within the upper and intermediate shell portions, and means forming a guide surface extending outwardly from the tube toward the lower edge of the intermediate shell portion and terminating at a distance inwardly from said edge, the inner and outer edges of adjacent vanes being overlapped thereby providing passages between the inner and outer edges of adjacent vanes, the sum of the distances across all of said passages from inner vane to outer vane being substantially equal to the radial width of the annular opening from the inlet scroll into the upper end of the upper shell portion.

11. In a dust collector of the character described, an upper, downwardly expanding shell portion, an intermediate cylindrical shell portion joined thereto, and a lower downwardly contracting shell portion joined to the lower edge of the cylindrical portion, an inlet scroll at the upper end of the upper shell portion opening downwardly into the upper shell portion, a central discharge tube forming the inner wall of the inlet scroll and extending downwardly into the lower shell portion, said shell portions, said scroll and said central tube being concentric, guide vanes arranged circumferentially about the tube in spaced relation thereto and extending downwardly from the scroll for directing air spirally outward from the tube within the upper and intermediate shell portions, and means forming a guide surface extending outwardly from the tube toward the lower edge of the intermediate shell portion and terminating at a distance inwardly from said edge, the radial width of the annular opening from the inlet scroll into the upper end of the upper shell portion being susbtantially equal to the radial distance from the outer edge of said guide surface to the cylindrical shell portion, the inner and outer edges of adjacent vanes being overlapped providing passages for air entering from the scroll, the sum of the distance across all of said passages from inner vane to outer vane being substantially equal to the radial thickness of the scroll opening.

12. In a dust collector of the character described, an upper, downwardly expanding shell portion, an intermediate cylindrical shell portion joined thereto, and a lower downwardly contracting shell portion joined to the lower edge of the cylindrical portion, an inlet scroll at the upper end of the upper shell portion opening downwardly into the upper shell portion, a central tube forming the inner wall of the inlet scroll and extending downwardly into the lower shell portion, the shell portions and tube being concentric, and means forming guide surfaces secured on said central tube dividing the space between the tube and said shell portions into upper and lower chambers, the distance in a direction parallel to the axis of the tube, from the guide surface to the shell portion in each chamber decreasing in proportion to increase in radial distance of the guide surface from the axis of the central discharge tube.

13. In a dust collector of the character described, an upper, downwardly expanding shell portion, an intermediate cylindrical shell portion joined thereto and a lower downwardly contracting shell portion joined to the lower edge of the cylindrical portion, an inlet scroll at the upper end of the upper shell portion opening downwardly into the upper shell portion, a central tube forming the inner wall of the inlet scroll and extending downwardly into the lower shell portion, the shell portions and tube being concentric, and means forming guide surfaces secured on said central tube dividing the space between the tube and said shell portions into upper and lower chambers, the distance, in a direction parallel to the axis of the tube, from the guide surface to the shell portion in each chamber decreasing in proportion to increase in radial distance of the guide surface from the axis of the central discharge tube, said last named means comprising an upper substantially conical member extending outwardly and downwardly from the tube toward the meeting line of the intermediate shell portion and the lower shell portion, and a lower substantially conical member extending downwardly and inwardly from the outer edge of the first named means to the tube.

CHAUNCEY M. PARK.

REFERENCES CITED

The following references are of record in the file of this patent:

UNITED STATES PATENTS

| Number | Name | Date |
|---|---|---|
| 397,048 | Bretney | Jan. 29, 1889 |
| 2,010,128 | Arnold | Aug. 6, 1935 |
| 2,068,459 | Monaghan | Jan. 19, 1937 |